Sept. 13, 1966  I. ROSENBLUM  3,273,012
AUTOMATIC HEADLIGHT CONTROL SYSTEM
Filed Nov. 13, 1963  2 Sheets-Sheet 1
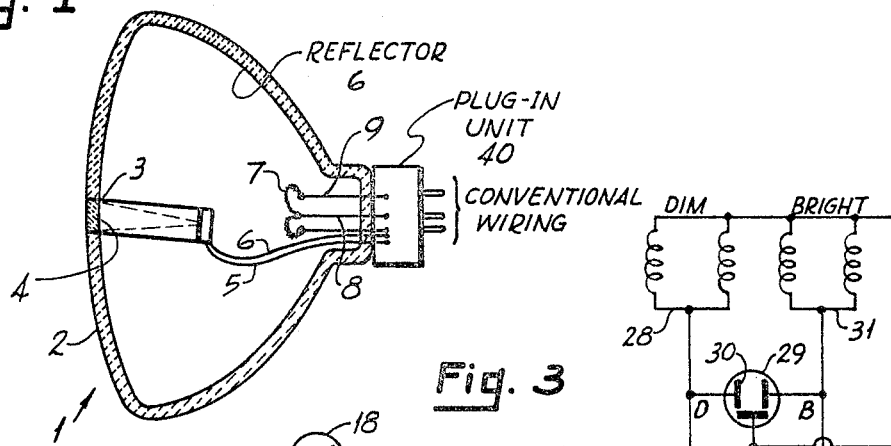
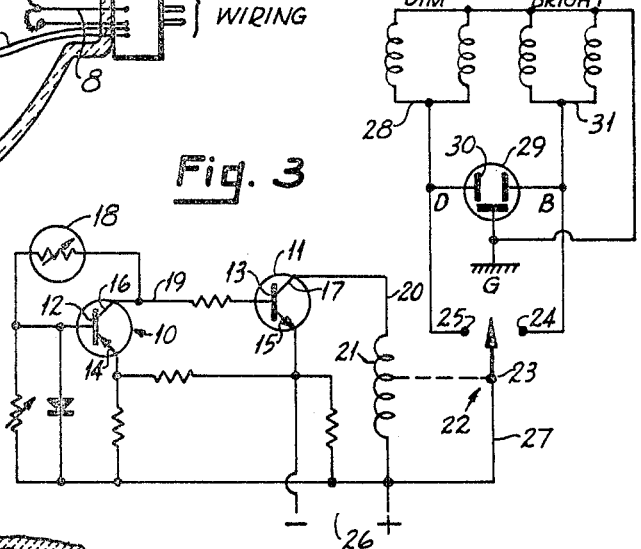
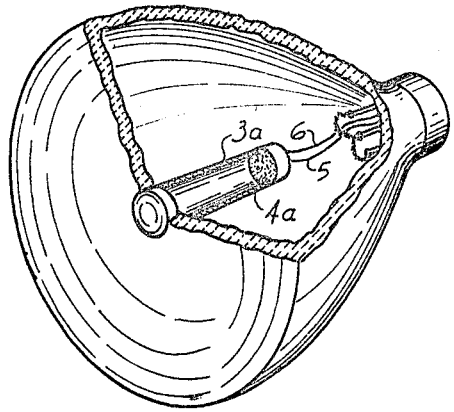
INVENTOR.
IRVING ROSENBLUM

INVENTOR.
IRVING ROSENBLUM

United States Patent Office 3,273,012
Patented Sept. 13, 1966

3,273,012
AUTOMATIC HEADLIGHT CONTROL SYSTEM
Irving Rosenblum, Bronx, N.Y., assignor to Dim-O-Matic, Inc., New York, N.Y., a corporation of New York
Filed Nov. 13, 1963, Ser. No. 323,483
4 Claims. (Cl. 315—82)

This invention relates to an automatic light control system for controlling the intensity of light emission and is particularly directed to automatic control means for dimming the headlights of a vehicle resulting from light reception of another vehicle.

The advantages of automatically controlling the dimming of automobile headlights are obvious that much work has already been done for this purpose. However, the equipment used heretofore has been complex, cumbersome and rather expensive to install.

It is one of the principal objects of the invention to provide an improved automatic headlight control system.

Another object of the invention is to provide an automatic headlight control system which is simple, easily controlled, relatively cheap to install, rugged and economical to control and operate.

Another object of the invention is to provide an automatic headlight control system which is compact, easily removable and replaceable and readily adaptable to existing headlight systems with a minimum amount of effort, cost and time.

A still further object of the invention is to provide a seal-beam type of headlight having incorporated therein a self-contained light sensitive control device for effecting circuitry which controls the degree and intensity of light emanating from the headlight.

Still a further object of the invention is to provide a seal-beam headlight fixture having incorporated therein a light sensitive control mechanism susceptable to variation of light intensity from on-coming and/or passing vehicles.

Other objects and advantages will become apparent from a reading of the specifications and a study of the accompanying drawings and wherein:

FIGURE 1 shows a perspective view of a headlight having a light sensitive device incorporated therein according to the invention.

FIGURE 2 shows the headlight of FIGURE 1 with an enclosure adhered thereto having the control circuit incorporated therein.

FIGURE 3 shows a schematic drawing of a control system capable of controlling the intensity of the light beam emanating from the headlight.

Figure 4:
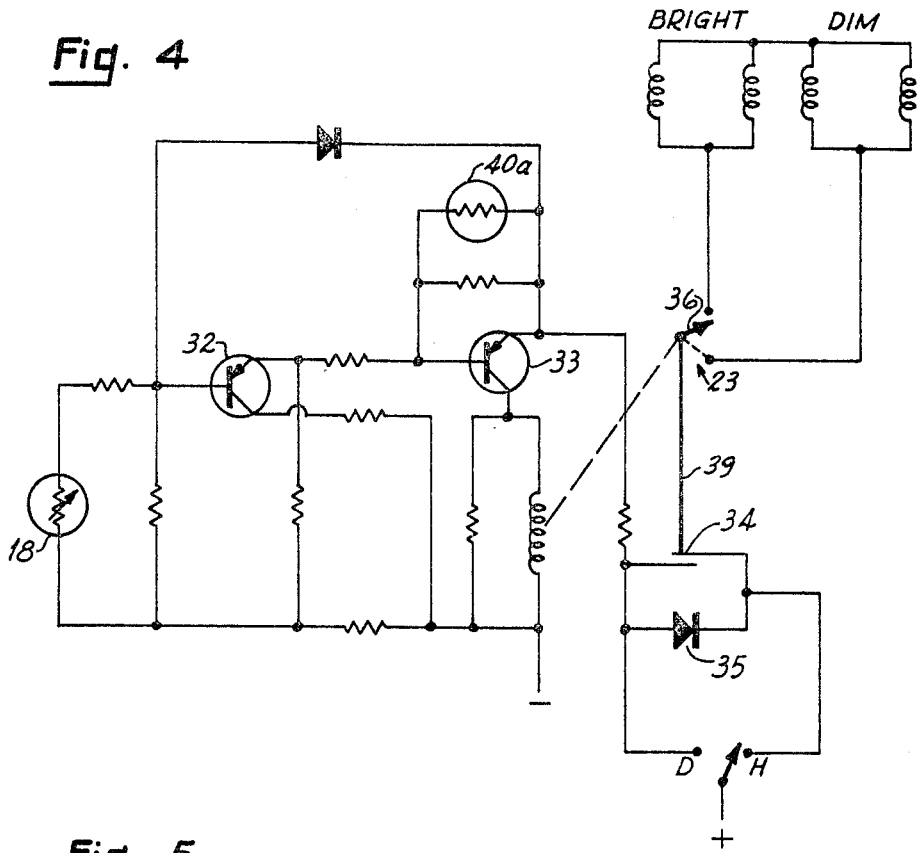
FIGURE 4 shows another schematic drawing of a control system as in FIGURE 3 with the addition of a cut-out switch mechanism for desensitizing the light sensitve control device according to the invention.

Now, describing the invention with respect to drawings, there is shown in particular in FIGURE 1 a seal-beam headlight 1 shaped in the conventional manner as used in the automotive industry and having a lens-shaped glass plate 2 with a small centrally disposed glass disc 3 adhered thereto and also lens-shaped. The disc 3 is a magnifying lens for magnifying light images impinging thereon and relaying such light upon a cell-like structure 4 through an enclosed chamber 3a, which may be composed of cadmium sulphide or some other light-sensitive element capable of reducing or changing its resistivity to the passage of an electric current in accordance with the degree and intensity of light impinging thereon. The cadmium sulphide cell 4 is adhered to the chamber 3a in any suitable manner but having its light-sensitive side facing the relay lens which focuses the incoming light thereon. The cell 4 is constructed in such a manner as to be capable of responding to light coming only from the front or side of the seal-beam and not from the back where the light of the headlight itself originates. This may be easily effected by coating the cell structure facing the light source of the headlight with graphite or some other similar material which is opaque to light. Further, the chamber 3a, composed of metal, fiber, and the like, is light-proof in the sense that no light can penetrate it from the internal filament.

The light-sensitive cell 4 has extending therefrom a pair of conductive leads or elements 5 and 6 terminating in the rear of the headlight and proceeding to become a part of the circuitry to be subsequently described.

There is further associated with the seal-beam the usual reflector 6 and low voltage lamp 7. The filament leads 8, 9 for the headlight lamp are connected to a special prong-like plug arranged to receive the said leads for providing to an external source low and high voltage potentials so as to provide both dim and bright lights. The potentials are of the usual automobile battery voltages, perhaps six or twelve volts.

Now proceeding with the circuitry, as embodied in FIGURES 3 and 4, for developing signals in accordance with light intensity variations there is shown, particularly with FIGURE 3, a transistorized amplifier composed of a pair of amplifying stages 10 and 11, each having respectively the usual base 12, 13, emitter 14, 15 and collector 16, 17. There is connected across base 12 and collector 16 of stage 10 a light-sensitive resistive element 18 which is variable in accordance with changes in light intensity impinging it. The current variations produced by the resistive variations of element 18 is reflected across amplifier 10 in corresponding voltage variation 19 and amplified thereby and further amplified by the final stage 11. Finally, the said amplified signal 20 is developed across coil impedance 21 which thereby affects or energizes relay 22. The relay 22 has a moving arm which engages one of a pair of contacts 24 and 25, depending upon which direction the arm or armature is energized. For example, where the coil current 20 through coil 21 exceeds a certain threshold level, resulting from excessive light impinging upon the cellular cell or light-sensitive resistor 18, the arm 23 will be urged in a direction so as to engage contact 25. Engaging contact 25 permits current from current source 26 to pass through current path 27 to dim lamp filaments 28 which are connected to lamp socket 29 via electrode 30 therein. Where the threshold level in coil 21 is not exceeded, or less, then the contact arm 23 engages contact 24 so as to disengage the dim filaments from the current source 26 and permit the engagement thereof with high or bright filament 31. Thus it can be seen that any variation in light intensity impinging upon the light-sensitive element will result in a light output variation of the headlight.

In FIGURE 4, an amplifier for amplifying signals similar to FIGURE 3 shows in particular a pair of stages 32, 33 connected in cascade and wherein the light-sensitive element 18 again provides the voltage variations corresponding to light variations produced by on-coming vehicles, external to the headlight wherein the said element resides. In particular there is shown in FIGURE 4 additional switching contacts 34 connected to relay 23, the contacts being open when the said relay is connected to the bright lamps and closed when connected to the dim lamps. The special diode 35 prevents high current which energizes the bright lamps from being transmitted to the transistors amplifies and thus protects it from breakdown. The diode is by-passed or shorted-out when the contacts are closed, this being the case when the dim lamps are energized. It may be appreciated that the high current rectifier 35 is provided with a heat sink which is in effect integral thereto as to provide a source of heat radiation to the ambient surroundings.

One of the novelties of the invention resides in the compactness of the elements which go to make up the control circuits and these are placed in small plug-in type unit 40, such as shown in FIGURE 1. All of the conventional wiring that is hooked up to the lamp is hooked up to the control plug or panel 40 and the lamp having the sensitized resistor element and then merely plugged into the unit and the system is ready for operation. There is no complicated wiring or check-out procedures for fault-finding. If there is a fault, all that is necessary is to remove the unit 40 and replace it with another unit. It's as simple as that.

Figure 5:
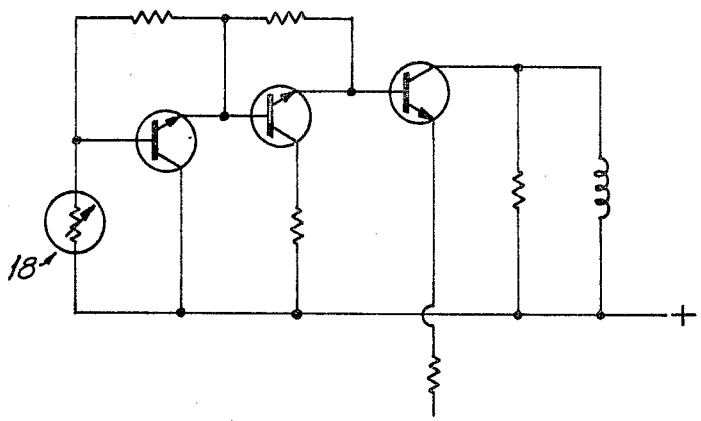
FIGURE 5 shows still another schematic drawing of the invention with special emphasis on silicon type transistors for effecting no-drift control.

FIGURE 5 shows still another transistorized amplifier suitable for processing changes in current variation produced as a result of the impedance changes of the light-sensitive element 18. In this particular amplifier, silicon type transistors are used since they are inherently stable and can be made to produce accurate result without need for temperature compensation, such as that which produces drift in the component values. In FIGURES 3 and 4 the transistors are of the germanium type and hence the requirement for temperature compensation, such as thermistor 40a, is necessary.

It may be appreciated that various changes in form and structure may be effected but that these should not detract from the true purpose and intent of the invention.

Having defined the invention, what is claimed is:

1. A sealed-beam automobile headlight lamp control for controlling the light output of said headlight comprising,
   (a) a parabolic shaped casing,
   (b) a source of light carried within and adjacent the rear of said casing,
   (c) a lens-shaped transparent glass member forming the frontal part of casing,
   (d) a cell-like light sensitive current carrying resistive element structure carried by the glass member and disposed to change its resistivity and corresponding current in response to light intensity variations external to the said casing,
   (e) amplifying means carried by the said casing and external thereto for receiving the said current changes responsive to resistive variations of the said cell-like structure,
   (f) and means for receiving said amplified current changes and controlling the seal-beam light output.

2. A sealed-beam automobile headlight lamp control according to claim 1 and wherein the cell-like light structure includes light focusing means for focusing external light variations upon the said cellular structure.

3. A sealed-beam automobile headlight lamp control according to claim 1 and wherein the cell-like structure is a cadmium sulphide cell disposed to change its chemical structure in accordance with light variations to produce a corresponding change in impedance to effect current flow changes.

4. A sealed-beam automobile headlight lamp control according to claim 1 and wherein the said means for controlling the seal-beam light output includes relay means responsive to said current variations to effect a change in current flow to the headlight lamps and a corresponding light output therefrom.

References Cited by the Examiner

UNITED STATES PATENTS

| | | | |
|---|---|---|---|
| 2,844,760 | 6/1958 | Rabinow | 315—83 |
| 2,850,673 | 9/1958 | Beckman et al. | 315—83 |
| 3,028,525 | 4/1962 | Morton | 313—318 X |

DAVID J. GALVIN, *Primary Examiner.*